(No Model.)
V. F. MOGK.
VEHICLE WHEEL.
No. 442,779. Patented Dec. 16, 1890.
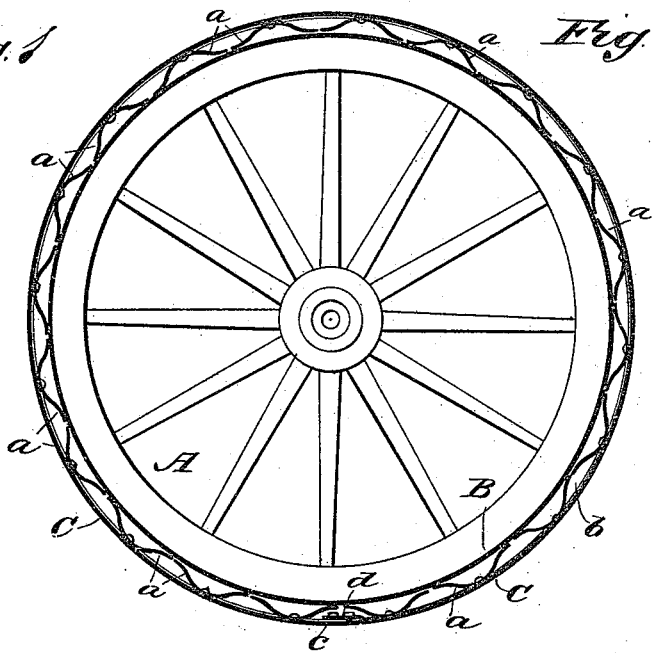
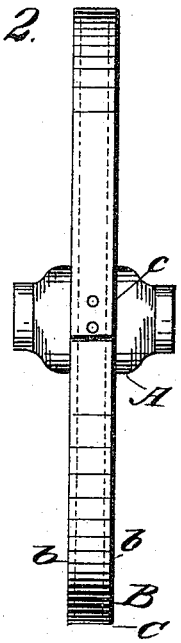
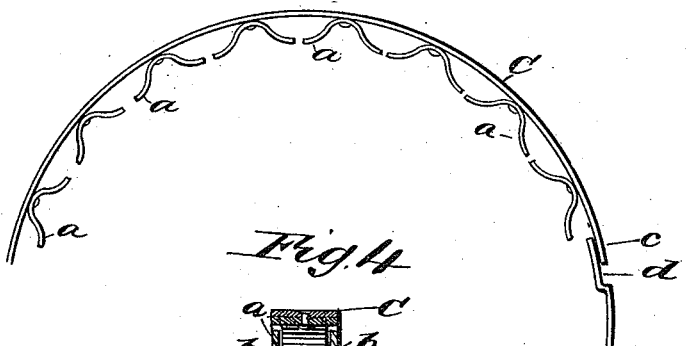
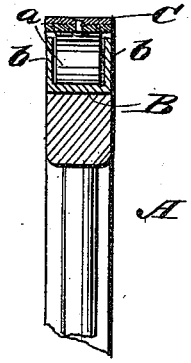
WITNESSES:
D. F. McArdle.
C. Sedgwick
INVENTOR:
V. F. Mogk
BY
ATTORNEYS

UNITED STATES PATENT OFFICE.

VICTOR F. MOGK, OF SEATTLE, WASHINGTON.

VEHICLE-WHEEL.

SPECIFICATION forming part of Letters Patent No. 442,779, dated December 16, 1890.

Application filed June 13, 1890. Serial No. 355,367. (No model.)

*To all whom it may concern:*

Be it known that I, VICTOR F. MOGK, of Seattle, in the county of King and State of Washington, have invented a new and useful Vehicle-Wheel, of which the following is a full, clear, and exact description.

This invention relates to an improvement in vehicle-wheels, and has for its object to provide a wheel which will be substantial and have elasticity afforded to its rim portion, whereby the percussion resulting from travel on a rough road-bed is absorbed and all shock or jar obviated.

To this end my invention consists in certain features of construction and combination of parts, as hereinafter described, and indicated in the claims.

Reference is to be had to the accompanying drawings, forming a part of this specification, in which similar letters of reference indicate corresponding parts in all the figures.

Figure 1 is a side elevation of a vehicle-wheel having the improvement thereon and shown in section taken on the line 1 1 in Fig. 2. Fig. 2 is an edge view of an upright wheel having the improved spring-tire device in place thereon. Fig. 3 is a side view of a portion of the spring-tire and spring attachments thereto; and Fig. 4 is an enlarged transverse section of a portion of the vehicle-wheel with the improvement combined therewith.

A represents a vehicle-wheel of any approved construction, whereon a channeled tire B is secured by the usual methods, said tire serving to hold the enveloped portions of the wheel in stable condition by its constriction upon the felly or rim of the same. The annular groove made in the body of the tire B is of such a proportionate depth and width as to afford a channel wherein the springs $a$ may be located and retained from lateral displacement.

A thinner elastic tire C is provided for the vehicle-wheel, which is of such a relative diameter to the fixed tire B that the series of semi-elliptical springs $a$ may be introduced between the tires, as shown in Fig. 1. The tire C is proportioned for the weight it is to sustain, and is joined at its end by lapping said portions $c$ $d$, as shown in Figs. 1 and 3, the end portions having spaced perforations for the introduction of bolts, whereby the tire is held intact as a continuous band.

It is necessary for the proper action of the device that the springs $a$ should be secured at their centers of length and width to the inner surface of the elastic tire C sufficiently removed from each other to permit independent flexion under load strain, the semi-elliptic springs $a$ having a loose contact with the side flanges $b$ of the channeled tire B, as represented in Fig. 4.

The width of the outer or elastic tire C is equal to that of the inner tire B, a sufficient annular space being provided between the tires to permit elastic action of the springs $a$ under ordinary load strain, the outer tire engaging the periphery of the inner tire when a disproportionate weight is thrown upon the wheels, so as to protect the springs from injury.

It is apparent that the series of springs $a$, coacting with the elastic tire C, will absorb to a great extent the percussion due to progressive movement of a vehicle having this improved form of wheels, the resilience of the elastic portions of the wheels insuring their resumption of a normal condition as they rotate and move over ground surface.

Having thus fully described my invention, what I claim as new, and desire to secure by Letters Patent, is—

1. In a wheel, the combination of an inner tire having an annular channel in its periphery, an outer elastic tire, and springs interposed between the outer tire and the bottom of the channel of the inner tire, the outer tire being of such diameter with respect to the inner tire that it engages the periphery thereof when the wheel is subjected to excessive weight, substantially as described.

2. In a wheel, the combination of an inner tire having an annular channel in its periphery, an outer elastic tire of slightly greater diameter than the inner tire, and semi-elliptical springs secured at their centers to the outer tire and having their ends resting upon the bottom of the channel of the inner tire, substantially as herein shown and described.

VICTOR F. MOGK.

Witnesses:
 WILL. R. WHITE,
 HARRY WHITE.